United States Patent

Pfeiffer et al.

Patent Number: 5,889,803
Date of Patent: Mar. 30, 1999

[54] RESONATOR FOR ELECTROMAGNETIC WAVES WITH A STABILIZER AND METHOD FOR STABILIZING THE LENGTH OF THE RESONATOR

[75] Inventors: Thomas Pfeiffer, Stuttgart; Gustav Veith, Bad Liebenzell, both of Germany

[73] Assignee: Alcatel Alsthom, Paris, France

[21] Appl. No.: 857,229

[22] Filed: May 16, 1997

[30] Foreign Application Priority Data

May 22, 1996 [DE] Germany ................... 196 20 594.8

[51] Int. Cl.⁶ ........................................ H01S 3/04
[52] U.S. Cl. .................... 372/34; 372/9; 372/12; 372/20; 372/38
[58] Field of Search .................... 372/9, 12, 20, 372/29, 33, 34, 38

[56] References Cited

U.S. PATENT DOCUMENTS

| | | | |
|---|---|---|---|
| 4,671,624 | 6/1987 | Kahan | 350/405 |
| 5,048,031 | 9/1991 | Thonn | 372/33 |
| 5,144,632 | 9/1992 | Thonn | 372/33 |
| 5,339,324 | 8/1994 | Eguchi et al. | 372/29 |
| 5,425,039 | 6/1995 | Hsu et al. | 372/6 |
| 5,481,398 | 1/1996 | Schoon | 359/323 |

FOREIGN PATENT DOCUMENTS

| | | | |
|---|---|---|---|
| 0155296 | 9/1985 | European Pat. Off. | 372/22 X |
| 3414478 | 10/1987 | Germany | 372/22 X |
| 3732794 | 3/1988 | Germany | 372/22 X |
| 4038364 | 6/1992 | Germany | 372/22 X |
| 4318752 | 12/1994 | Germany | 372/22 X |
| 4445244 | 6/1995 | Germany | 372/22 X |

OTHER PUBLICATIONS

"Stabilizing Er Fibre Soliton Laser with Pulse Phase Locking", X. Shan et al., *Electronics Letters*, 16 Jan. 1992, Vol. 28, No. 2, pp. 182–184.

*Primary Examiner*—Brian Healy
*Attorney, Agent, or Firm*—Ware, Fressola, Van Der Sluys & Adolphson LLP

[57] ABSTRACT

A resonator (1) for electromagnetic waves with a stabilizer can, for example, be part of a mode-coupled fiber laser. The stabilizer (2) is provided to stabilize the effective length of the resonator (1). Stabilization is accomplished in a first embodiment via two temperature controllers (3, 4) controlling the temperature of a first portion (L1) and the temperature of a second portion (L2) of the resonator (1). The temperature of the second portion (L2) is controlled as a function of an error signal generated by deviations of the resonator (1) from a nominal length. The second portion (L2) is significantly shorter than the first portion (L1).

8 Claims, 1 Drawing Sheet

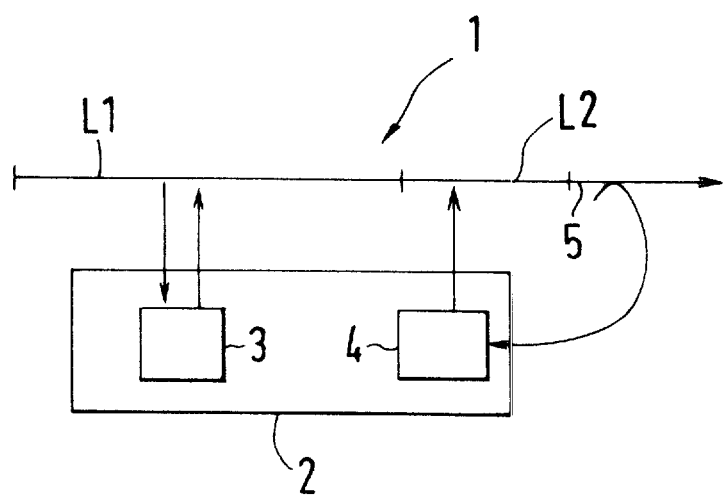

RESONATOR FOR ELECTROMAGNETIC WAVES WITH A STABILIZER AND METHOD FOR STABILIZING THE LENGTH OF THE RESONATOR

BACKGROUND OF THE INVENTION

1. Technical Field of the Invention

The invention relates to a resonator for electromagnetic waves with a stabilizer for stabilizing the effective length of the resonator. In addition, the invention relates to a method for stabilizing the length of a resonator.

2. Description of Related Art

A resonator for electromagnetic waves is, for example, an optical wave guide which forms part of a fiber laser. Fiber lasers are known in the art, for example, from X. Shan et al., "Stabilizing Er Fiber Soliton Laser With Pulse Phase Locking", Electronics Letters, 16 Jan. 1992, Vol. 28, No. 2, pages 182 to 184. Described therein is an active mode coupled fiber laser. The fiber laser is constructed as a ring laser and serves as an optical pulse generator. Into the fiber ring there is inserted, among others, a piezo-electric element, a phase modulator, and a coupler for coupling out a portion of the light. By applying the voltage to the piezo-electric element, the fiber segment around which the piezo-electric element is wound can be stretched; in this way, the length of the fiber segment can be changed. A portion of the light from the fiber ring is coupled out by the coupler and conveyed to a phase control device which generates the voltage for the piezo-electric element.

It is noted in the aforementioned publication that fiber lasers can be very sensitive to changes in temperature, i.e. the length of the fiber ring can change as a result of, e.g., temperature variations which can lead to an unstable laser operation. This poses a problem in particular in data transmission technology where minute instabilities can already cause unacceptable bit error rates. The piezo-electric element is capable of reducing the effect of a temperature dependent change in length, because the fiber segment can be stretched more or less depending on the magnitude and the direction of the change in length.

In this way, the length, or more accurately, the effective lengths of the fiber ring (resonator) is stabilized. For the effective lengths $L_{eff}$ holds: $L_{eff}=\sqrt{\epsilon_{68}} \times L_{geo}$, with the dielectric constant $\epsilon$ and the geometrical length $L_{geo}$; for optical applications, $\sqrt{\epsilon}$ is equal to the index of refraction n and the term "optical length" is used.

As an alternative to the aforedescribed concept, the optical length of a fiber segment can also be stabilized by controlling the temperature of the fiber segment. The required accuracy of the control of about ±0.01° C. requires, however, a substantial technical investment.

SUMMARY OF THE INVENTION

It is an object of the invention to provide a resonator for electromagnetic waves which includes a stabilizer, where the stabilization of the effective lengths of the resonator is performed differently.

According to a first aspect of the invention, a resonator for electromagnetic waves with a stabilizer for stabilizing an effective length of the resonator is characterized in that the stabilizer has a first device for controlling a temperature of a first portion of the resonator, and that the stabilizer has a second device for changing a length of a second portion of the resonator in response to an error signal indicative of the effective length of the resonator for stabilizing the effective length of the resonator.

It is also an object of the invention to provide a method for stabilizing the length of a resonator for electromagnetic waves.

According to a second aspect of the invention, a method of stabilizing an effective length of a resonator for electromagnetic waves which is connected to a stabilizer, is characterized in that in a first step, a temperature of a first portion of the resonator is controlled by a first device, in a second step, an error signal is derived from the effective length of the resonator, and in a third step, an effective length of a second portion of the resonator is changed in response to an error signal to stabilize the effective length of the resonator.

According to a third aspect of the invention, a resonator for electromagnetic waves with a stabilizer for stabilizing the effective length of the resonator is characterized in that the stabilizer has a first device for controlling the geometric or effective length of a first portion of the resonator, and that the stabilizer has a second device for changing a geometric or effective length of a second portion of the resonator in response to an error signal indicative of the effective length of the resonator to thereby stabilize the effective length of the resonator.

One advantage of the invention is that in one embodiment, the requirement for the accuracy of the temperature control for the resonator is reduced significantly, for example, by about one order of magnitude from 0.01° C. to 0.1° C.

BRIEF DESCRIPTION OF THE DRAWING

The invention will be described hereinafter with reference to an example and in conjunction with a single drawing.

DETAILED DESCRIPTION OF THE PREFERRED EMBODIMENTS

In the drawing, there is shown a resonator 1 for electromagnetic waves with a stabilizer 2. The resonator 1 and the stabilizer 2 can, for example, be portions of a fiber laser; in the present case, the resonator 1 is an optical wave guide which can also be designed as a ring. For the purpose of the subsequent description, the resonator 1 is an optical wave guide.

Further applications of the invention relate to optical components wherein interferences play a role. Examples for optical components of this type are Fabry-Perot interferometers and Mach-Zehnder interferometers which can be made of fiber optics, integrated optics, or based on semiconductors. These optical components, too, include resonators wherein the optical length of the resonators has to be stabilized, in order to minimize the impact of temperature variations. The invention, however, can basically be applied in all situations where an exact stabilization of the effective length of the resonator is important, for example, in the field of microwave technology, where hollow resonators are employed.

The depicted resonator 1 has an overall length of l and is subdivided in a first portion L1 and in a second portion L2. For the subsequent discussions, the first portion L1 shall have a length of 29 meters and a second portion L2 a length of 1 meter. The geometrical length of the resonator 1 is therefore 30 meters. Light exits from one end 5 of the second portion L2 wherein the light can be used to derive an error signal with the help of means which are not shown.

In a first embodiment, there are provided in the stabilizer 2 two temperature control devices 3, 4; the temperature control device 3 is associated with the first portion L1, and the temperature control device 4 is associated with the second portion L2. Both temperature control devices 3, 4 include means (e.g. evaluation circuits and Peltier elements) for controlling the temperature of the first portion L1 and the temperature of the second portion L2. The error signal is supplied to the temperature control device 4. In the following, a control mechanism for the first embodiment will be described in greater detail with reference to a numerical example for a mode coupled fiber laser.

With a (geometrical) length of the resonator 1 of 30 m, the optical length is 43.5 m (optical length=geometrical length× index of refraction n of the resonator 1; n=1.45). A stable operation of the mode coupled fiber laser requires a relative stabilization of the length of resonator 1, i.e., of the optical length of resonator 1, to a value in the range of $10^{-7}$. With a length of the resonator of 30 m, the change in length caused by changes in temperature must therefore not exceed 4.35 $\mu$m. Changes in temperature of merely a few degrees centigrade, however, cause significantly larger changes in the length: for quartz glass, the temperature coefficient of the index of refraction is about $10^{-5}/°C$. and of the (geometrical) change in length about $10^{-4}/°C$. These data show that for the temperature control a temperature accuracy of ±0.01° C. would be required.

The temperature of the first portion L1 is held constant by the temperature control device 3 with an accuracy of 0.1° C. This tolerance range of the temperature causes the index of refraction to change which in turn can cause a change in the optical length of the first portion L1 of ±42.05 $\mu$m. This change in the optical length of the first portion L1, and consequently the change in the optical length of resonator 1, causes an error signal which is directly dependent on the magnitude of the change in length. The error signal is caused by a deviation of the actual optical length of the resonator 1 from a nominal value of the optical length of resonator 1 where no or only insignificant instabilities of the fiber laser occur. This error signal can be derived from characteristic parameters of the resonator emission. Such a characteristic parameter is, for example, the amplitude of the relaxation oscillations occurring the resonator 1.

The error signal can, for instance, be derived by evaluating deviations in the synchronization. The fiber laser includes, aside from the aforedescribed resonator 1 and the stabilizer 2, also a pump laser and an optical amplifier. The pump laser and the optical amplifier are not shown in the figure. After the pump laser of the actively mode coupled fiber laser is switched on, signal light is generated in the resonator 1, emerging from the noise, wherein the signal light is created by stimulated emission in the optical amplifier. Light exiting the fiber laser is composed of the signal light and noise; the noise signal is, for example, caused by relaxation oscillations which occur in fiber lasers as a result of variations of the pump wavelength or of the pump power of the pump laser or as a result of variations of the losses in the resonator caused by external thermal or mechanical effects. The amplitude of the noise signal changes depending on the accuracy of the synchronization of the round-trip frequency and external clock frequency. The amplitude of the noise signal is a minimum at the point of optimum synchronization. When the deviation in the synchronization between the round-trip frequency and the external clock frequency increases, the amplitude of the noise signal increases. Consequently, the error signal can be derived from the amplitude of the noise signal.

In principle, the error signal can also be derived by other methods which directly or indirectly determine the optical length of the resonator or deviations from the nominal length. It is important that there exists a correlation between the error signal and the deviation from the nominal length.

The derived error signal is supplied to the temperature control device 4 which can change the temperature of the second portion L2, i.e. the shorter fiber segment, by ±3° C. with an accuracy of ±0.1° C., which can change the optical length of the second portion L2 by ±43.5 $\mu$m. If the temperature of the first portion L1 increases by, for example, ±0.1° C. as a result of control errors, then the temperature of the second portion L2 will be lowered by −2.9° C. in order to compensate for the change in the optical length. Since both temperature control devices 3, 4 have an accuracy of ±0.1° C., the accuracy of the effective length is thus improved to $3.3 \times 10^{-8}$.

In a second embodiment, there are provided in the stabilizer 2 a temperature control device 3 and an electromechanical device. The explanations given above apply also to the temperature control device 3. The electromechanical device associated with the second portion L2 of the resonator 1 is, for example, a piezo-electric element, around which the second portion L2 or a portion thereof is wound. The volume of the piezo-electric element can be increased or decreased by varying an applied voltage, resulting in an expansion or contraction of the second portion L2. The magnitude of the voltage depends on the error signal supplied to the piezo-electric element. It was already described in the foregoing, how the error signal is derived.

In another embodiment, the stabilizer 2 includes an electro-optical device instead of the electro-mechanical device, wherein the index of refraction in the electro-optical device can be changed by an applied voltage.

An electro-optic device is known in the art and is, e.g., implemented in form of an element made of lithium niobate ($LiNbO_3$). The electro-optic device is inserted in the second portion L2 of the resonator 1 in such a way that it is located in the path of the light. The applied voltage also depends on the error signal. The changes in the index of refraction mentioned above cause a change in the effective length of the second portion L2.

In another embodiment, the stabilizer 2 can be modified in the following way, whereby the effective length of resonator 1 can also be stabilized. Instead of the temperature control device 3, the stabilizer 2 can include an electromechanical device or an electro-optical device for controlling the geometrical or optical length of the first portion L1 of the resonator 1. It has already been described with reference to the previous embodiments, how a control can be implemented with an electromechanical or an electro-optical device. Also in the case where the first portion L1 is controlled as just described, an error signal can be derived from the characteristic resonator emission wherein the error signal is caused by the deviation between the actual optical length of the resonator 1 and a nominal value of the optical length of resonator 1. As in the previous example, an electromechanical or electro-optical device can be used for the device 4 associated with the second portion L2 of resonator 1.

In this embodiment, the stabilizer 2 therefore includes a device 3 for controlling the geometrical or effective length of the first portion L1 of resonator 1, and a device 4 capable of changing, depending on the error signal, the geometrical or effective length of the second portion L2 of resonator 1, in order to thereby stabilize the effective length of the resonator 1.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A system including a resonator (1) for electromagnetic waves with a stabilizer (2) for stabilizing an effective length of the resonator (1), characterized in that the resonator has a length that is subdivided in a first portion (L1) and in a second portion (L2), that the stabilizer (2) has a first device (3) for controlling a temperature of the first portion (L1) of the resonator (1), and that the stabilizer (2) has a second device (4) for changing a length of the second portion (L2) of the resonator (1) in response to an error signal indicative of the effective length of the resonator (1) for stabilizing the effective length of the resonator (1).

2. System as claimed in claim 1, characterized in that the first portion (L1) of the resonator (1) is longer than the second portion (L2) of the resonator.

3. System as claimed in claim 1, characterized in that the second device (4) is a temperature control device which controls a temperature of the second portion (L2) of the resonator (1) for changing the effective length of the second portion (L2).

4. System as claimed in claim 1, characterized in that the second device (4) is an electromechanical device for changing the length of the second portion (L2) of the resonator (1) by strain or compression.

5. System as claimed in claim 1, characterized in that the second device (4) is an electro-optical device capable of changing the effective length of the second portion (L2) of the resonator (1) in accordance with the magnitude of an applied voltage.

6. System as claimed in claim 1, characterized in that the error signal is indicative of characteristic parameters of a resonator emission, and that the error signal represents a deviation from a selected value of the effective length of the resonator (1).

7. A method of stabilizing an effective length of a resonator (1) for electromagnetic waves which is connected to a stabilizer (2), characterized in that the resonator has a length that is subdivided in a first portion (L1) and in a second portion (L2), that in a first step, a temperature of the first portion (L1) of the resonator (1) is controlled by a first device (3), in a second step, an error signal is derived from the effective length of the resonator (1), and in a third step, an effective length of the second portion (L2) of the resonator (1) is changed in response to an error signal to stabilize the effective length of the resonator (1).

8. A system including a resonator (1) for electromagnetic waves with a stabilizer (2) for stabilizing the effective length of the resonator (1), characterized in that the resonator has a length that is subdivided in a first portion (L1) and in a second portion (L2), that the stabilizer (2) has a first device (3) for controlling a geometric or effective length of the first portion (L1) of the resonator (1), and that the stabilizer (2) has a second device (4) for changing a geometric or effective length of the second portion (L2) of the resonator (1) in response to an error signal indicative of the effective length of the resonator (1) to thereby stabilize the effective length of the resonator (1).

* * * * *